US008315340B1

United States Patent
Kim (10) Patent No.: US 8,315,340 B1
(45) Date of Patent: Nov. 20, 2012

(54) BEACON SIGNAL PROCESSING CIRCUIT, HIGH-SPEED SYNCHRONIZATION CIRCUIT AND RECEIVING TERMINAL INCLUDING THE SAME

(75) Inventor: Tae Sung Kim, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 836 days.

(21) Appl. No.: 12/418,870

(22) Filed: Apr. 6, 2009

(51) Int. Cl.
H04L 27/06 (2006.01)
(52) U.S. Cl. .......................... 375/340; 375/316
(58) Field of Classification Search ............ 375/340
See application file for complete search history.

(56) References Cited

U.S. PATENT DOCUMENTS

| 5,706,278 | A | * | 1/1998 | Robillard et al. | 370/222 |
| 2008/0225961 | A1 | * | 9/2008 | Jeong | 375/260 |
| 2009/0172198 | A1 | * | 7/2009 | Hekstra-Nowacka et al. | 709/248 |

FOREIGN PATENT DOCUMENTS

| KR | 1020050073709 | 7/2005 |
| KR | 1020070015350 | 2/2007 |

OTHER PUBLICATIONS

English Abstract for Publication No. 1020050073709.
English Abstract for Publication No. 1020070015350.
Ronald A. Burger, et al., "A Survey of Digital TV Standards China," Proceedings of the IEEE.
Eric Pinson, TeamCast, Terrestrial Mobile TV, Technologies & Implementation, Paris Nov. 8, 2007.

* cited by examiner

Primary Examiner — Shuwang Liu
Assistant Examiner — Michael Neff
(74) Attorney, Agent, or Firm — F. Chau & Associates, LLC (57) ABSTRACT

A high-speed synchronization circuit for synchronizing a receiving signal with a terminal at high speed and a receiving terminal including the same are provided. The high-speed synchronization circuit updates synchronization information by processing a beacon signal included in at least one time slot and maintains synchronization using the beacon signal, thereby reducing time taken to acquire synchronization and minimizing power consumption.

17 Claims, 7 Drawing Sheets

BEACON SIGNAL PROCESSING CIRCUIT, HIGH-SPEED SYNCHRONIZATION CIRCUIT AND RECEIVING TERMINAL INCLUDING THE SAME

BACKGROUND

1. Technical Field

The present invention relates to a synchronization system, and more particularly, to beacon signal processing circuit, a high-speed synchronization circuit and a receiving terminal including the same.

2. Discussion of the Related Art

China Mobile Multimedia Broadcasting (CMMB) is a mobile television (TV) and multimedia standard specified in China by the State Administration of Radio, Film, and Television (SARFT), in which broadcasting services are provided using a time-slot based frame structure. The time slot is used to divide a channel in a time domain and fixedly assigned the channel to each of a plurality of access points so that the plurality of access points can use a shared transmission medium without collision. In the CMMB, time-slicing is used to minimize power consumption.

Meanwhile, a data signal included in a desired service logic channel (SLCH) is decoded after channel information is received using a control logic channel (CLCH) in the CMMB. Due to this feature of the CMMB, the effect of the time slicing for reducing power consumption may be significantly diminished when the SLCH is dispersed.

SUMMARY

Some exemplary embodiments of the present invention provide a high-speed synchronization circuit for maximizing the power-saving effect of time slicing in China Mobile Multimedia Broadcasting (CMMB) and a receiving terminal including the same.

According to some exemplary embodiments of the present invention, there is provided a beacon signal processing circuit including a beacon signal detector configured to detect a beacon signal included in a time slot. A time-slot counter is configured to count a time-slot number in response to the beacon signal detected by the beacon signal detector and output a control signal for enabling the beacon signal detector based on the counted number. A processing unit is configured to process the beacon signal detected by the beacon signal detector in response to the control signal output from the time-slot counter. The time slot and the beacon signal may accord with CMMB standards.

The control signal output from the time-slot counter may enable the beacon signal detector to detect a beacon signal included a time slot corresponding to a control logic channel and a beacon signal included in at least one of a plurality of time slots corresponding to a service logic channel.

The beacon signal processing circuit may further include a storage unit configured to store information about the beacon signal detected by the beacon signal detector and to update beacon signal information in response to a result of processing the beacon signal. Synchronization may be maintained during time slicing based on beacon signal information last updated at the storage unit.

The processing unit may include a demodulator configured to demodulate the beacon signal. A fast Fourier transform (FFT) processor performs FFT on a demodulated beacon signal. A sampling frequency recovery (SFR) processor estimates a sampling offset of a fast Fourier transformed beacon signal. A time processor receives the estimated sampling offset and reflects an offset from a current clock signal and generates a clock masking signal. A clock generator generates a system clock signal based on the clock masking signal.

According to other exemplary embodiments of the present invention, there is provided a high-speed synchronization circuit including a beacon signal processing circuit and a decoding circuit. The decoding circuit establishes synchronization based on a beacon signal processed by the beacon signal processing circuit. The decoding circuit also decodes at least one selected time slot. The beacon signal processing circuit includes a beacon signal detector configured to detect a beacon signal included in the time slot. A time-slot counter counts a time-slot number in response to the beacon signal detected by the beacon signal detector and output a control signal for enabling the beacon signal detector based on the counted number. A processing unit processes the beacon signal detected by the beacon signal detector in response to the control signal output from the time-slot counter.

The time slot and the beacon signal may accord with CMMB standards. The control signal output from the time-slot counter may enable the beacon signal detector to detect a beacon signal included a time slot corresponding to a control logic channel and a beacons signal included in at least one of a plurality of time slots corresponding to a service logic channel.

According to exemplary embodiments of the present invention, there is provided a receiving terminal including a receiving unit configured to receive a broadcasting signal and a high-speed synchronization circuit configured to synchronize the broadcasting signal with the receiving terminal. The high-speed synchronization circuit includes a beacon signal processing circuit configured to detect a beacon signal included in a time slot in the broadcasting signal and to process the beacon signal. The high-speed synchronization circuit additionally includes a decoding circuit configured to establish synchronization based on the beacon signal processed by the beacon signal processing circuit and to decode at least one selected time slot.

BRIEF DESCRIPTION OF THE DRAWINGS

The above and other features and aspects of exemplary embodiments of the present invention will be described in detail with reference to the attached drawings, in which.

DETAILED DESCRIPTION OF THE EXEMPLARY EMBODIMENTS

The present invention now will be described more fully hereinafter with reference to the accompanying drawings, in which exemplary embodiments of the invention are shown. This invention may, however, be embodied in many different forms and should not be construed as limited to the embodiments set forth herein. In the drawings, the size and relative sizes of layers and regions may be exaggerated for clarity. Like numbers may refer to like elements throughout.

It will be understood that when an element is referred to as being "connected" or "coupled" to another element, it can be directly connected or coupled to the other element or intervening elements may be present.

Figure 1:
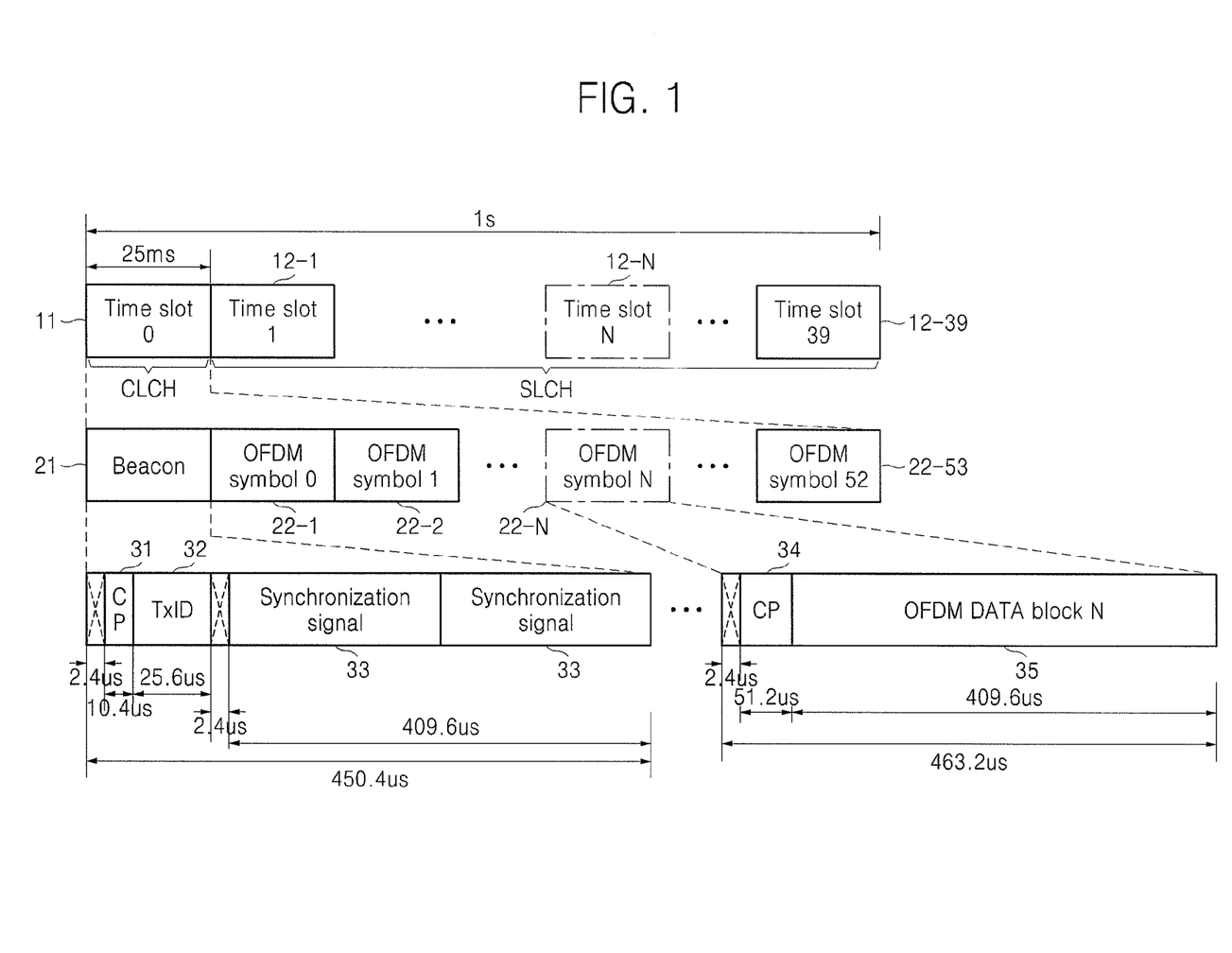
FIG. 1 illustrates the structure of a China Mobile Multimedia Broadcasting (CMMB) frame format according to some exemplary embodiments of the present invention.

FIG. 1 illustrates the structure of a China Mobile Multimedia Broadcasting (CMMB) frame format according to some exemplary embodiments of the present invention. CMMB uses a time-slot based frame structure to provide broadcasting services. In the CMMB, a fast Fourier transform (FFT) mode and a guard interval (GI) mode may be fixed, for example, to 4K and ⅛ GI, respectively.

Referring to FIG. 1, a frame having a length of 1 s (second) may include a plurality of time slots 11 and 12-1 through 12-39, each having a length of 25 ms (millisecond). The first time slot 11 existing in the first frame may correspond to a control logic channel (CLCH) and the other time slots 12-1 through 12-39 may correspond to a service logic channel (SLCH). The CLCH may include information about the SLCH.

Each of the time slots 11 and 12-1 through 12-39 may include a beacon signal 21 (or a pilot symbol) and a plurality of orthogonal frequency division multiplexing (OFDM) symbols 22-1 through 22-53. The beacon signal 21 may be used by a receiving terminal to establish channel synchronization. The OFDM symbols 22-1 through 22-53 may include broadcasting data. Accordingly, the receiving terminal receiving a CMMB signal transmitted from a transmitting terminal may establish synchronization using the beacon signal 21. The beacon signal 21 may include a cyclic prefix (CP) 31, a transmission identification (TxID) signal 32, and a plurality of synchronization signals 33.

The CP 31 may prevent inter-channel interference (ICI) or inter-symbol interference (ISI) which may occur when subcarriers are not cyclic due to multi-path delay of a transmission channel. In detail, the CP 31 may be generated by duplicating a part of an end of the TxID signal 32 so that the subcarriers have a cyclic characteristic, thereby effectively preventing ICI or ISI. The TxID signal 32 may include information necessary for decoding. For example, the TxID signal 32 may include code information (e.g., a low density parity code (LDPC) or a Reed-Solomon (RS) code), code rate information, and/or decoding mode information. The synchronization signals 33 may be used by a receiving terminal supporting the CMMB to establish synchronization.

Each of the OFDM symbols 22-1 through 22-53 may include a CP 34 and an OFDM data block 35. The CP 34 is generated by duplicating a part of the end of the OFDM data block 35, so that ICI or ISI can be efficiently prevented.

Figure 2:
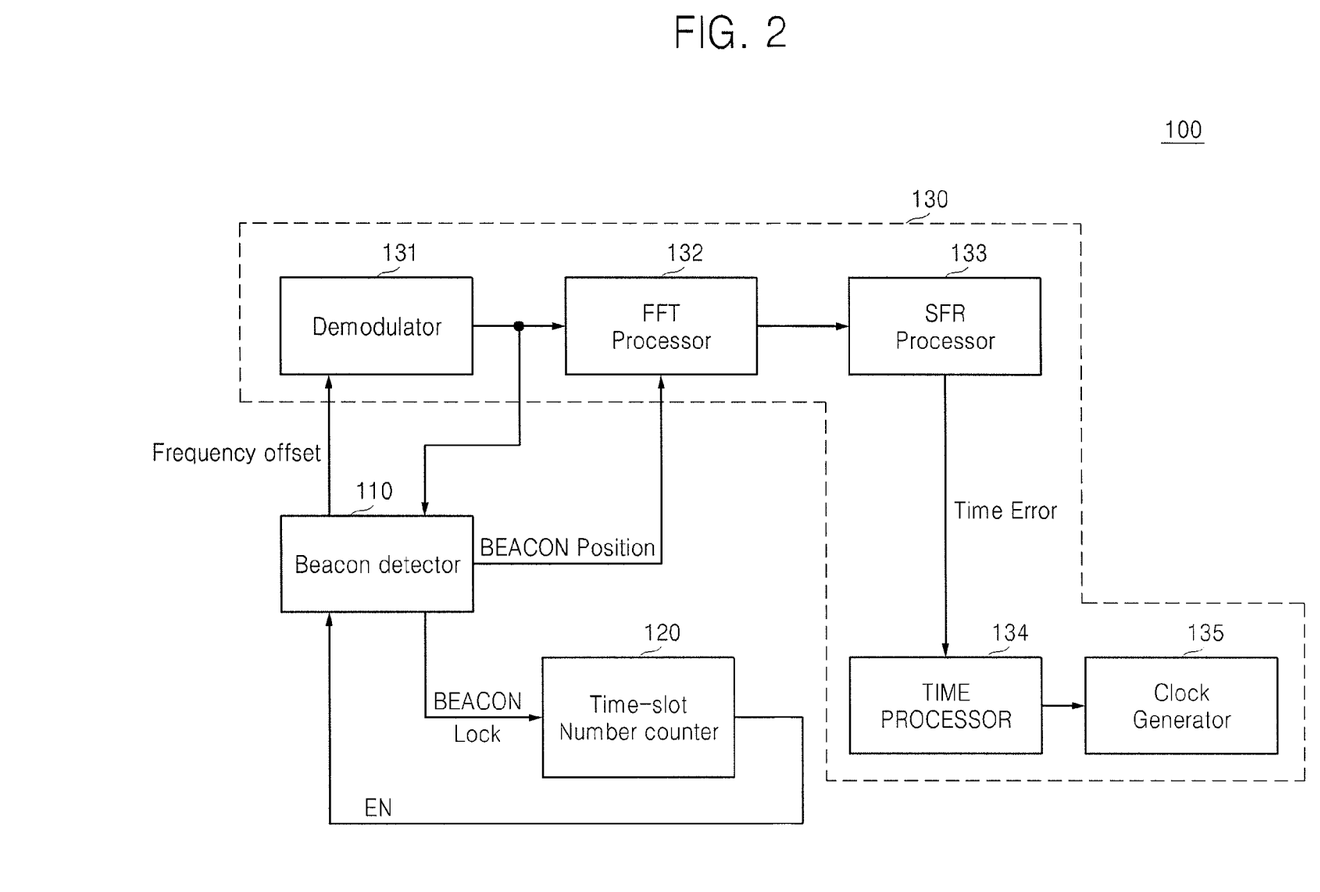
FIG. 2 is a block diagram of a beacon signal processing circuit according to some exemplary embodiments of the present invention.

FIG. 2 is a block diagram of a beacon signal processing circuit 100 according to some exemplary embodiments of the present invention. Referring to FIGS. 1 and 2, the beacon signal processing circuit 100 may include a beacon detector 110, a time-slot number counter 120, and a beacon signal processing unit 130.

The beacon detector 110 may detect a beacon signal in a received broadcasting signal in response to a control signal EN output from the time-slot number counter 120. For example, the beacon detector 110 may detect a beacon signal in each time slot using an auto-correlation function. The beacon detector 110 detects the beacon signal 21 in the time slot 11 corresponding to the CLCH and initial synchronization is established. Although initial synchronization information may be acquired from one of a plurality of time slots included in the first received frame, the initial synchronization information may be acquired from the time slot 11 corresponding to the CLCH because information about the SLCH is included in the time slot 11 corresponding to the CLCH. This initial synchronization information can be used thereafter. The beacon detector 110 may also estimate a frequency offset during time slicing after the initial synchronization since it recognizes the position of the beacon signal 21.

The time-slot number counter 120 may function as a main controller of the beacon signal processing circuit 100 and may count the number of time slots. During the initial synchronization, a current time-slot number and a time-slot border may be acquired and counting may be commenced. Whenever the beacon signal 21 is detected by the beacon detector 110, the time-slot number is updated by the time-slot number counter 120. The time-slot number counter 120 may output the control signal EN enabling the beacon detector 110 to output beacon position information.

Information about the beacon signal 21 detected by the beacon detector 110 may be stored in the time-slot number counter 120 or a separate storage unit (not shown). The information about the beacon signal 21 may be updated through the detecting operation of the beacon detector 110 and the processing operation of the beacon signal processing unit 130.

The beacon signal processing unit 130 may include a demodulator 131, an FFT processor 132, a sampling frequency recovery (SFR) processor 133, a time processor 134, and a clock generator 135. The demodulator 131 may demodulate the beacon signal 21 detected by the beacon detector 110. At this time, frequency offset information output from the beacon detector 110 may be used. The FFT processor 132 may perform FFT on a beacon signal output from the demodulator 131. At this time, beacon position information output from the beacon detector 110 may be used.

The SFR processor 133 may recover a sampling frequency with respect to data output from the FFT processor 132 and may estimate a sampling offset. The sampling offset estimated by the SFR processor 133 is a time error and may be transmitted to the time processor 134. The time processor 134 may express the received time error as an offset from a current clock signal and output a clock masking signal to the clock generator 135. The clock generator 135 may output a system clock signal based on the clock masking signal received from the time processor 134.

Figure 3A:
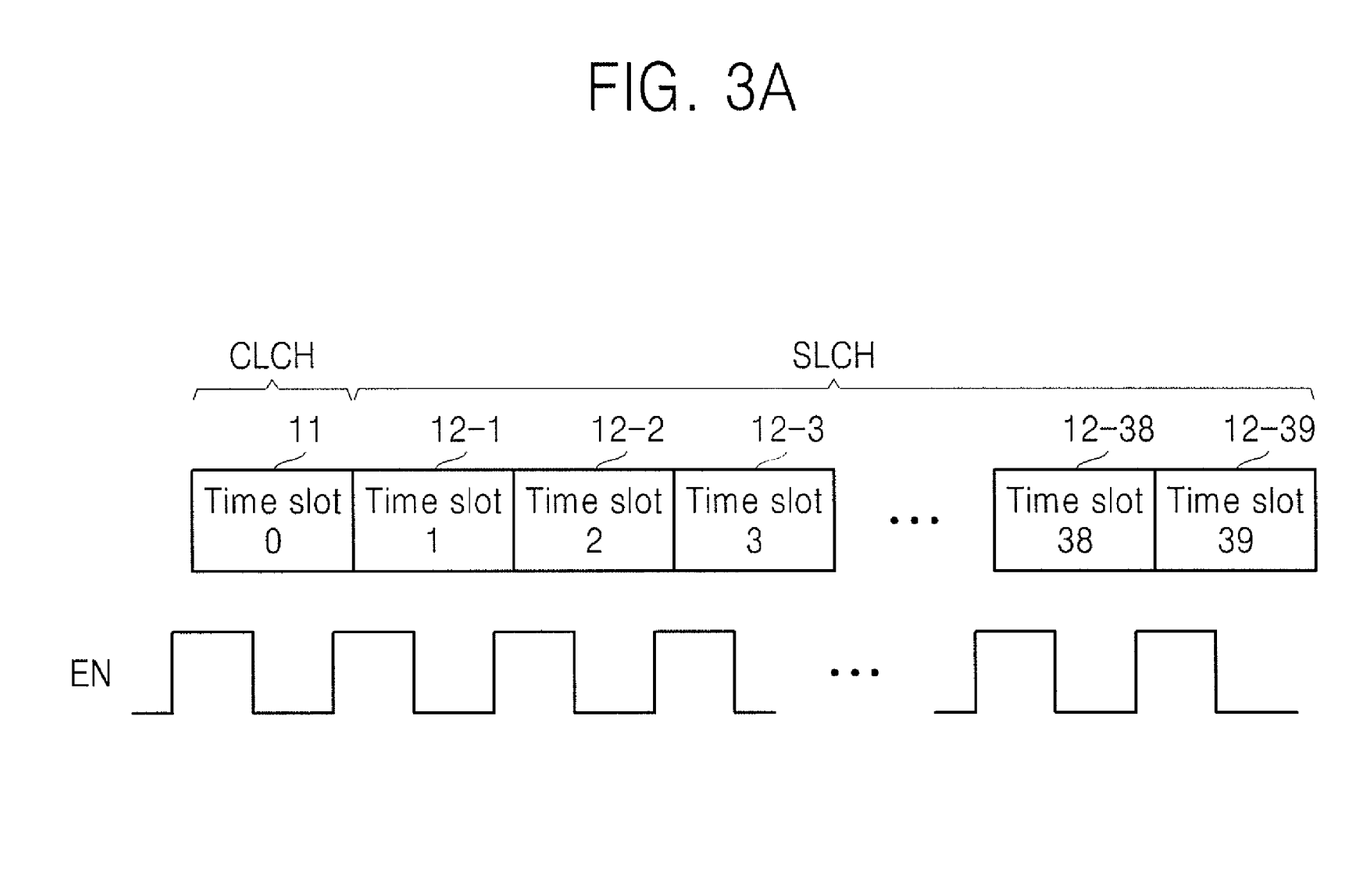
FIGS. 3A and 3B illustrate the enabling of a beacon detector according to some exemplary embodiments of the present invention.
Figure 3B:
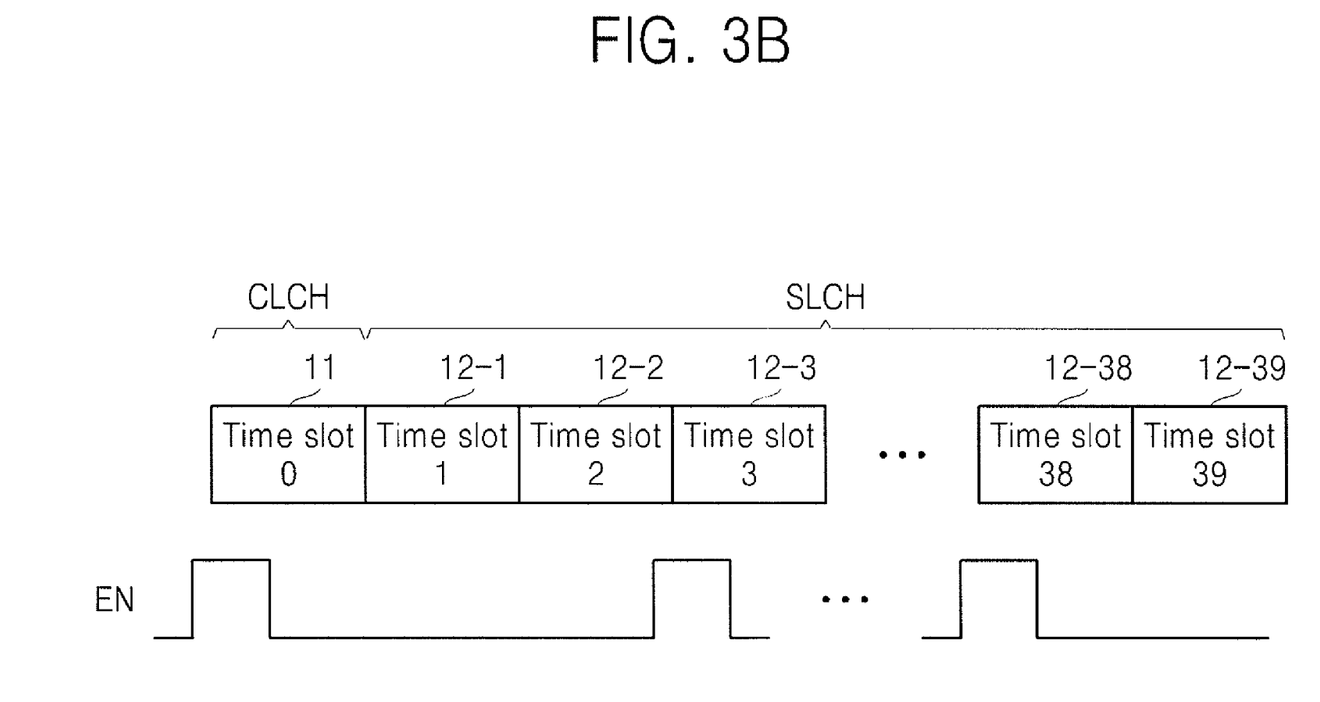

FIGS. 3A and 3B illustrate the enabling of the beacon detector 110 according to some exemplary embodiments of the present invention. Referring to FIGS. 1 through 3A, the beacon detector 110 may perform detection of a beacon signal in response to receiving the control signal EN output from the time-slot number counter 120. For example, the beacon detector 110 may be disabled in response to the control signal EN at a first level (e.g., a low level) and may be enabled in response to the control signal EN at a second level (e.g., a high level).

Referring to FIG. 3A, the beacon detector 110 performs the detection of the beacon signal 21 in every time slot 11 and 12-1 through 12-39. At this time, synchronization information is updated at each time slot so that the latest beacon signal can be used to establish synchronization. For example, beacon signal information can be updated at intervals of 25 ms. The beacon signal information may include an integer-multiplied frequency offset, a gain value, and/or a sampling offset.

Referring to FIG. 3B, the beacon detector 110 may perform the detection of the beacon signal 21 with respect to a subset of the time slots 12-1 through 12-39. For example, since the time slot 11 corresponding to the CLCH includes information about the SLCH, it is efficient to acquire initial synchronization based on the time slot 11 in a synchronization circuit included in a receiving terminal. In addition, the beacon detector 110 may perform the detection with respect to a subset of the time slots 12-1 through 12-39 corresponding to the SLCH. Accordingly, when data included in a subset of the time slots 12-1 through 12-39 corresponding to the SLCH is decoded, a decoding circuit (200 in FIG. 5) can establish synchronization using the latest beacon signal information detected by the beacon detector 110 and updated by the time-slot number counter 120.

Conventionally, it takes about 80 ms to achieve a decodable state since synchronization is established in a blind state and this procedure is needed with respect to each of the CLCH and the SLCH, and therefore, about 160 ms is needed to establish synchronization in a single frame period. According to some exemplary embodiments of the present invention, however, since synchronization is maintained using a beacon signal included in a time slot, time corresponding to about a three-symbol length is consumed every time the beacon signal is input, and therefore, it takes a maximum of 120 ms to establish synchronization in a single frame period. As a result, power consumption of a synchronization circuit can be greatly reduced.

Figure 4A:
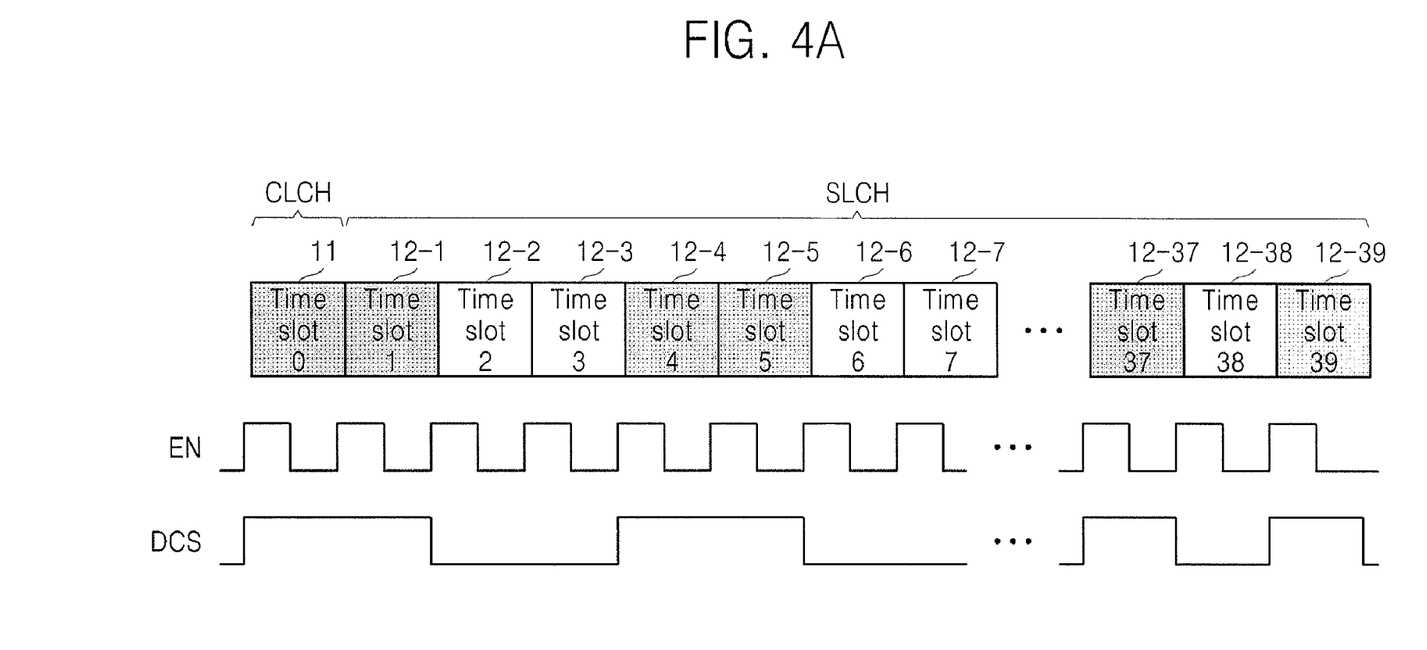
FIGS. 4A and 4B illustrate the enabling of a beacon detector and a decoding circuit according to some exemplary embodiments of the present invention.
Figure 4B:
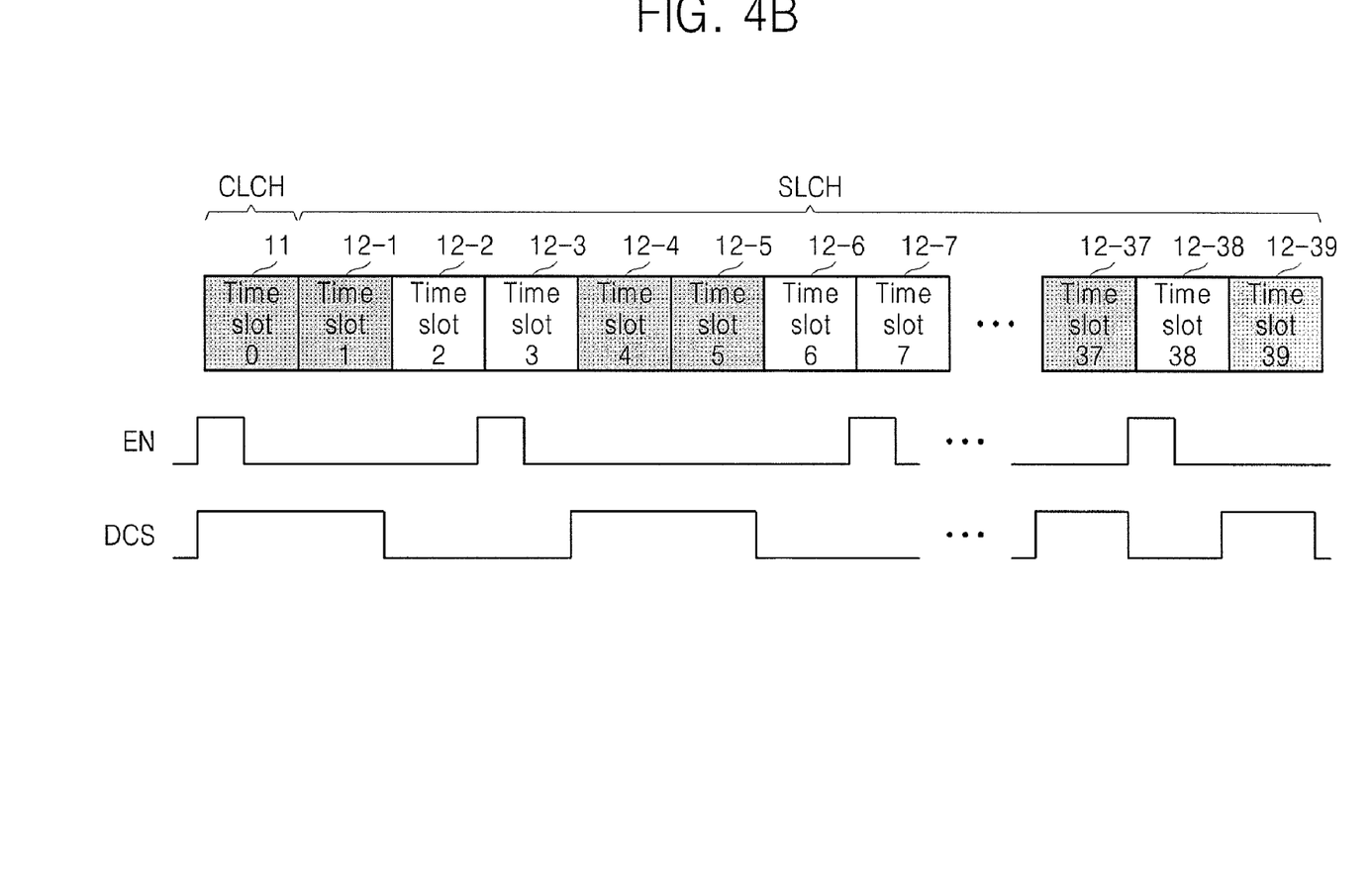

FIGS. 4A and 4B illustrate the enabling of the beacon detector 110 and a decoding circuit according to some exemplary embodiments of the present invention. Since time slots used in the CMMB divide a channel in a time domain to allow a plurality of access points to share a transmission medium, the SLCH to be decoded by a receiving terminal may be dispersedly received. Referring to FIGS. 4A and 4B, the time slot 11 corresponding to the CLCH and at least some time slots 12-1, 12-4, 12-5, ..., 12-37, and 12-39 among the time slots 12-1 through 12-39 corresponding to the SLCH are received and decoded.

Like FIG. 3A, FIG. 4A illustrates a case where the beacon detector 110 performs the detection of a beacon signal with respect to all of the time slots 11 and 12-1 through 12-39. Like 3B, FIG. 4B illustrates a case where the beacon detector 110 performs the detection of a beacon signal with respect to the time slot 11 corresponding to the CLCH and some time slots 12-1, 12-4, 12-5, ..., 12-37, and 12-39 among the time slots 12-1 through 12-39 corresponding to the SLCH.

As described above, since the CLCH includes the information about the SLCH, the decoding circuit decodes the time slot 11 corresponding to the CLCH and decodes time slots corresponding to the SLCH. Referring to FIG. 4A, time slots to be decoded are shaded. The SLCH to be decoded is dispersely distributed due to the characteristics of the CMMB. Accordingly, the decoding circuit (200 in FIG. 5) may perform decoding with respect to a particular time slot in response to a control signal DCS. For example, the decoding circuit may be disabled in response to the DCS at a first level (e.g., a low level) and may be enabled in response to the control signal DCS at a second level (e.g., a high level).

Referring to FIG. 4A, since the detection and update of a beacon signal is performed with respect to all of the time slots 11 and 12-1 through 12-39, when information of a particular time slot is decoded, synchronization can be established based on the beacon signal included in the particular time slot. Referring to FIG. 4B, since the detection and update of a beacon signal is performed with respect to the time slot 11 corresponding to the CLCH and some of the time slots 12-1 through 12-39 corresponding to the SLCH, when information of a certain time slot is decoded, synchronization can be established based on most recently updated beacon signal information. For example, the decoding circuit may decode data of a fourth time slot 4 based on beacon signal information updated using a beacon signal included in a third time slot 3. Since the synchronization can be established or maintained based on updated beacon signal information, time taken to establish the synchronization can be reduced and high efficiency can be maintained when a plurality of channels are decoded.

Figure 5:
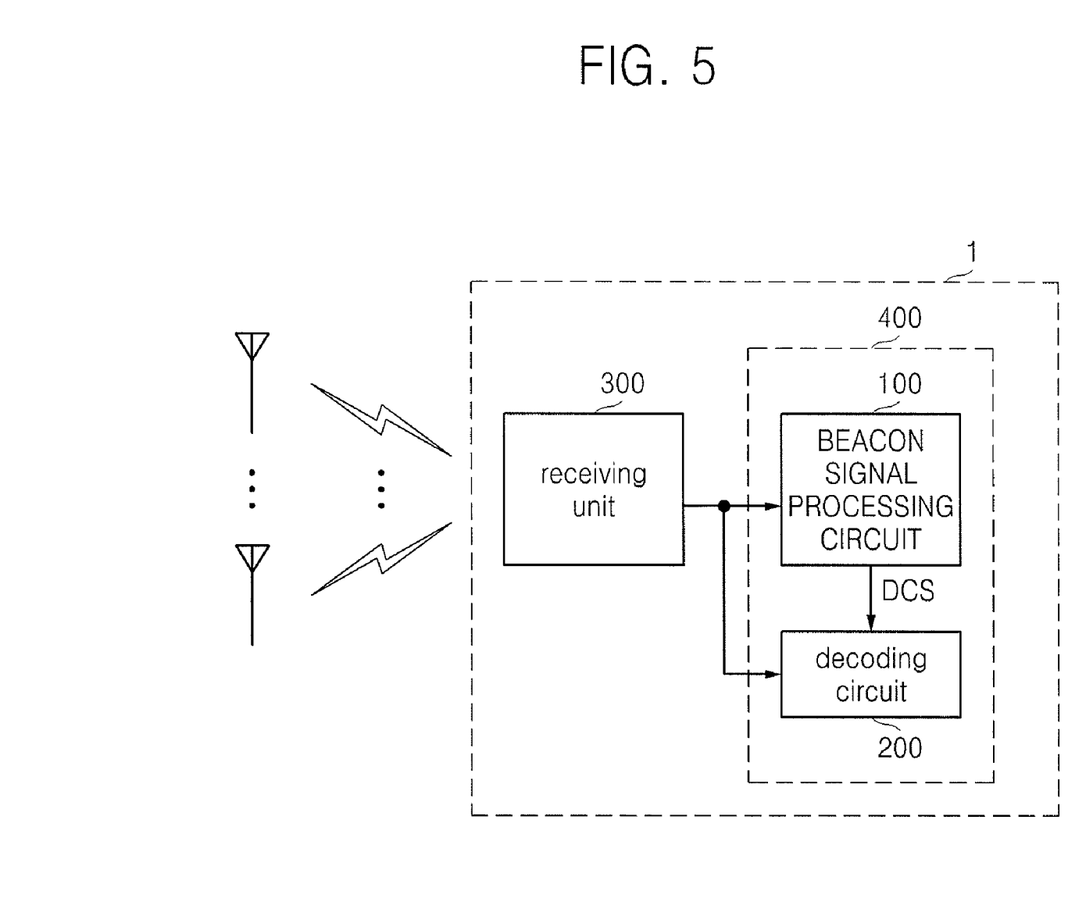
FIG. 5 is a block diagram of a high-speed synchronization circuit and a receiving terminal including the same according to some exemplary embodiments of the present invention.

FIG. 5 is a block diagram of a high-speed synchronization circuit 400 and a receiving terminal 1 including the same according to some exemplary embodiments of the present invention. Referring to FIGS. 1 through 5, the high-speed synchronization circuit 400 may include the beacon signal processing circuit 100 illustrated in FIG. 2 and a decoding circuit 200.

The decoding circuit 200 may selectively decode desired time slots of the SLCH in response to the control signal DCS output from the beacon signal processing circuit 100. In detail, since the time-slot number counter 120 included in the beacon signal processing circuit 100 recognizes the position of a beacon signal, the control signal DCS may be output from the time-slot number counter 120.

The receiving terminal 1, receiving a broadcasting signal transmitted from a transmitting station, may also include a receiving unit 300 for receiving the broadcasting signal. The broadcasting signal received by the receiving unit 300 may be transmitted to the high-speed synchronization circuit 400.

According to some exemplary embodiments of the present invention, a high-speed synchronization circuit updates synchronization information using a beacon signal included in a time slot and maintains synchronization using the beacon signal during time slicing, thereby maximizing efficiency when a plurality of channels are decoded and increasing efficiency when a channel having a small amount of information is decoded.

While exemplary embodiments of the present invention has been particularly shown and described with reference to the figures, it will be understood by those of ordinary skill in the art that various changes in forms and details may be made therein without departing from the spirit and scope of the present invention.

What is claimed is:

1. A beacon signal processing circuit comprising:
    a beacon signal detector configured to detect a beacon signal included in a time slot, wherein the time slot is a division of a channel in a time domain;
    a time slot counter configured to count a number of time-slots in response to the beacon signal detected by the beacon signal detector and output a control signal for enabling the beacon signal detector based on the counted number of time slots; and
    a beacon signal processor configured to process the beacon signal detected by the beacon signal detector in response to the control signal output from the time slot counter, wherein the control signal output from the time slot counter enables the beacon signal detector to detect:
    a beacon signal included in a time slot corresponding to a control logic channel; and
    a beacon signal included in at least one of a plurality of time slots corresponding to a service logic channel.

2. The beacon signal processing circuit of claim 1, wherein the time slot and the beacon signal conform to China Mobile Multimedia Broadcasting (CMMB) specifications.

3. The beacon signal processing circuit of claim 1, wherein the beacon signal processor comprises:

a demodulator configured to demodulate the beacon signal
and to output a demodulated beacon signal;
a fast Fourier transform (FFT) processor configured to
perform FFT on the demodulated beacon signal and to
output a fast Fourier transformed beacon signal;
a sampling frequency recovery (SFR) processor configured to estimate a sampling offset of the fast Fourier transformed beacon signal;
a time processor configured to receive the estimated sampling offset and express the estimated sampling offset as an offset from a current clock signal to generate a clock masking signal; and
a clock generator configured to generate a system clock signal based on the clock masking signal.

4. The beacon signal processing circuit of claim 3, wherein the beacon signal processor further comprises a storage device configured to store information about the beacon signal detected by the beacon signal detector and to update beacon signal information in response to a result of processing the beacon signal.

5. The beacon signal processing circuit of claim 4, wherein synchronization is maintained during time slicing based on beacon signal information most recently updated at the storage device.

6. The beacon signal processing circuit of claim 1, wherein the beacon signal processed by the beacon signal processor is used to establish synchronization with a decoding circuit.

7. A high-speed synchronization circuit comprising:
a beacon signal processing circuit; and
a decoding circuit configured to establish synchronization based on a beacon signal processed by the beacon signal processing circuit and to decode data included in a time slot, which is a division of a channel in a time domain, based on the established synchronization,
wherein the beacon signal processing circuit comprises:
a beacon signal detector configured to detect a beacon signal included in the time slot;
a time slot counter configured to count a number of time slots in response to the beacon signal detected by the beacon signal detector and output a control signal for enabling the beacon signal detector based on the counted number of time slots; and
a beacon signal processor configured to process the beacon signal detected by the beacon signal detector in response to the control signal output from the time-slot counter and to generate the processed beacon signal,
wherein the control signal output from the time slot counter enables the beacon signal detector to detect:
a beacon signal included in a time slot corresponding to a control logic channel; and
a beacon signal included in at least one of a plurality of time slots corresponding to a service logic channel.

8. The high-speed synchronization circuit of claim 7, wherein the time slot and the beacon signal conform to China Mobile Multimedia Broadcasting (CMMB) specifications.

9. The high-speed synchronization circuit of claim 7, wherein the beacon signal processor comprises:
a demodulator configured to demodulate the beacon signal and to output a demodulated beacon signal;
a fast Fourier transform (FFT) processor configured to perform FFT on the demodulated beacon signal and to output a fast Fourier transformed beacon signal;
a sampling frequency recovery (SFR) processor configured to estimate a sampling offset of the fast Fourier transformed beacon signal;
a time processor configured to receive the estimated sampling offset and express the estimated sampling offset as an offset from a current clock signal to generate a clock masking signal; and
a clock generator configured to generate a system clock signal based on the clock masking signal.

10. The high-speed synchronization circuit of claim 9, wherein the beacon signal processor further comprises a storage device configured to store information about the beacon signal detected by the beacon signal detector and to update beacon signal information in response to a result of processing the beacon signal.

11. The high-speed synchronization circuit of claim 10, wherein synchronization is maintained during time slicing based on beacon signal information most recently updated at the storage device.

12. A receiving terminal comprising:
a receiving unit configured to receive a broadcasting signal; and
a high-speed synchronization circuit configured to synchronize the broadcasting signal with the receiving terminal,
wherein the high-speed synchronization circuit comprises:
a beacon signal processing circuit configured to detect a beacon signal included in a time slot, which is a division of a channel in a time domain, in the broadcasting signal and to process the beacon signal; and
a decoding circuit configured to establish synchronization based on the beacon signal processed by the beacon signal processing circuit and to decode the time slot based on the established synchronization,
wherein the beacon signal processing circuit comprises:
a beacon signal detector configured to detect a beacon signal included in the time slot;
a time slot counter configured to count a number of time slots in response to the beacon signal detected by the beacon signal detector and output a control signal for enabling the beacon signal detector based on the counted number of time slots; and
a beacon signal processor configured to process the beacon signal detected by the beacon signal detector in response to the control signal output from the time slot counter and to generate the processed beacon signal, wherein the control signal output from the time slot counter enables the beacon signal detector to detect:
a beacon signal included in a time slot corresponding to a control logic channel; and
a beacon signal included in at least one of a plurality of time slots corresponding to a service logic channel.

13. The receiving terminal of claim 12, wherein the time slot and the beacon signal conform to China Mobile Multimedia Broadcasting (CMMB) specifications.

14. The receiving terminal of claim 12, wherein the beacon signal processor comprises:
a demodulator configured to demodulate the beacon signal and to output a demodulated beacon signal;
a fast Fourier transform (FFT) processor configured to perform FFT on the demodulated beacon signal and to output a fast Fourier transformed beacon signal;
a sampling frequency recovery (SFR) processor configured to estimate a sampling offset of the fast Fourier transformed beacon signal;
a time processor configured to receive the estimated sampling offset and express the estimated sampling offset as an offset from a current clock signal to generate a clock masking signal; and a clock generator configured to generate a system clock signal based on the clock masking signal.

15. The receiving terminal of claim 14, wherein the beacon signal processor further comprises a storage device configured to store information about the beacon signal detected by the beacon signal detector and to update beacon signal information in response to a result of processing the beacon signal.

16. The receiving terminal of claim 15, wherein synchronization is maintained during time slicing based on beacon signal information most recently updated at the storage device.

17. A beacon signal processing circuit comprising:
- a beacon signal detector configured to detect a beacon signal included in a time slot, wherein the time slot is a division of a channel in a time domain;
- a time slot counter configured to count a number of time slots in response to the beacon signal detected by the beacon signal detector and output a control signal for enabling the beacon signal detector based on the counted number of time slots; and
- a processing unit beacon signal processor configured to process the beacon signal detected by the beacon signal detector in response to the control signal output from the time slot counter, the beacon signal processor further comprises:
- a demodulator configured to demodulate the beacon signal and to output a demodulated beacon signal;
- a fast Fourier transform (FFT) processor configured to perform FFT on the demodulated beacon signal and to output a fast Fourier transformed beacon signal;
- a sampling frequency recovery (SFR) processor configured to estimate a sampling offset of the fast Fourier transformed beacon signal;
- a time processor configured to receive the estimated sampling offset and express the estimated sampling offset as an offset from a current clock signal to generate a clock masking signal;
- a clock generator configured to generate a system clock signal based on the clock masking signal; and
- a storage device configured to store information about the beacon signal detected by the beacon signal detector and to update beacon signal information in response to a result of processing the beacon signal.

* * * * *